Figure 1:
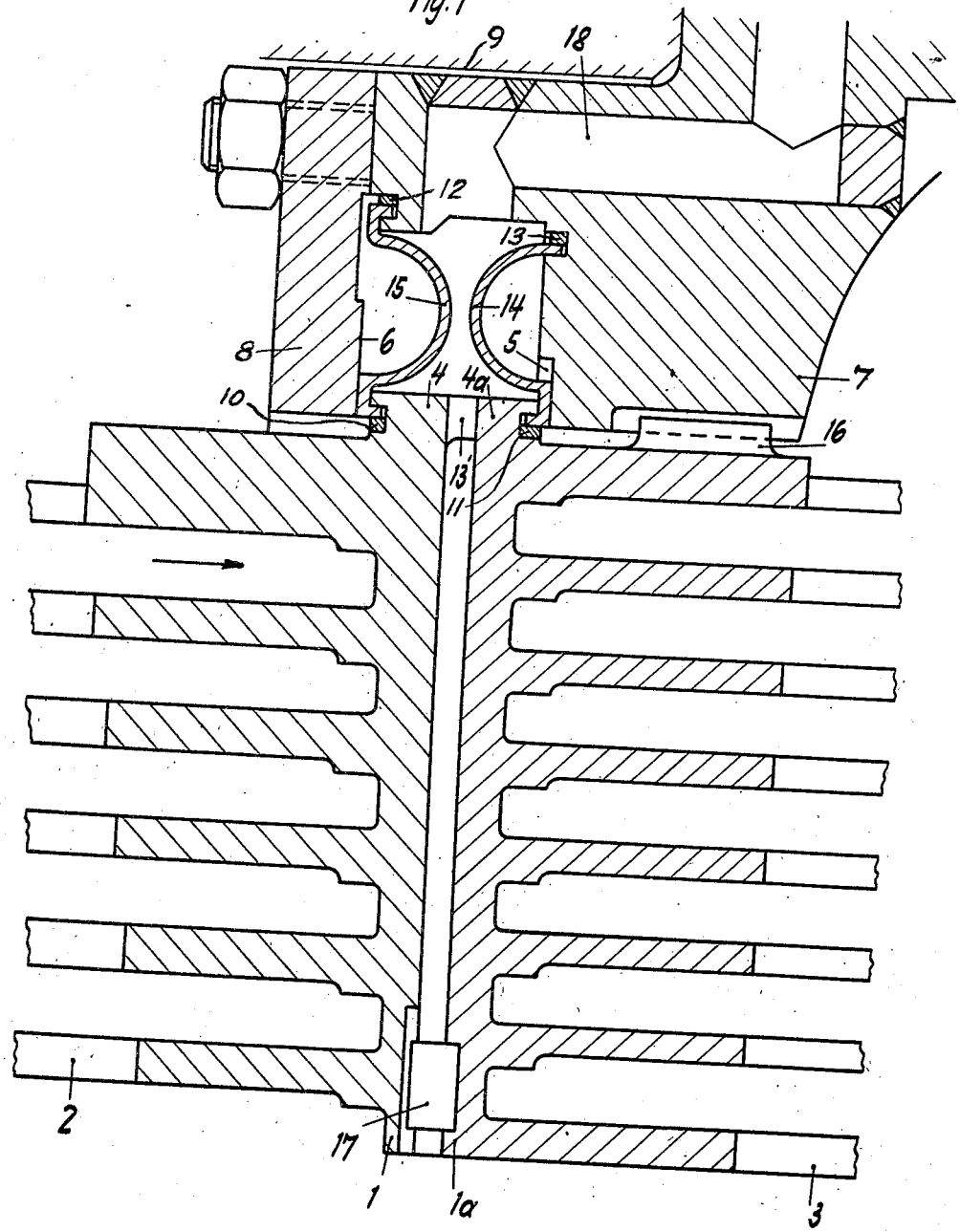

March 14, 1944.  U. MEININGHAUS  2,344,101
ELASTIC SUPPORT OF DISKS FOR RADIAL FLOW ROTARY MACHINES
Filed March 25, 1941  3 Sheets-Sheet 1

INVENTOR
U. Meininghaus
BY
Lackenbach & Hirschman
ATTORNEYS

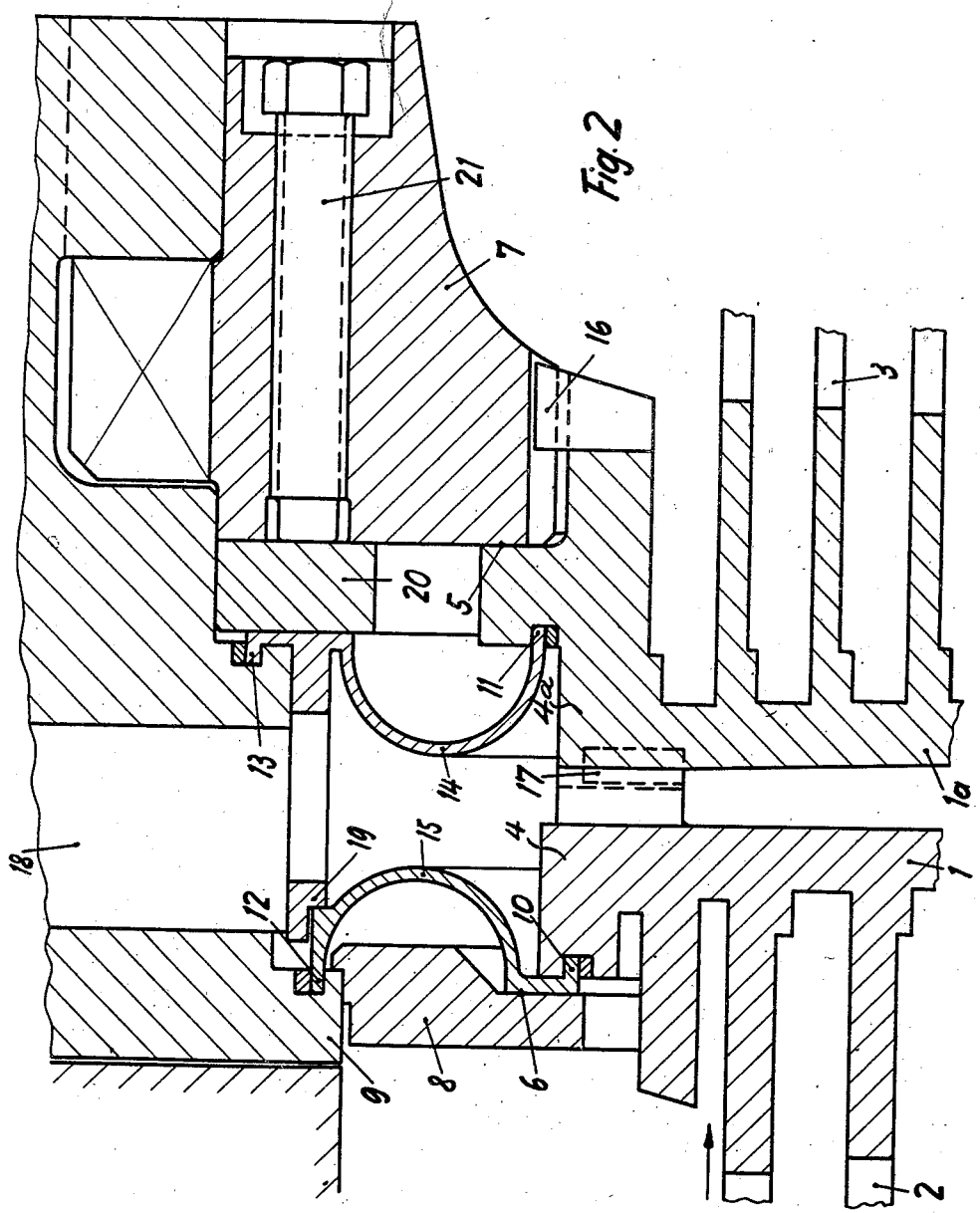

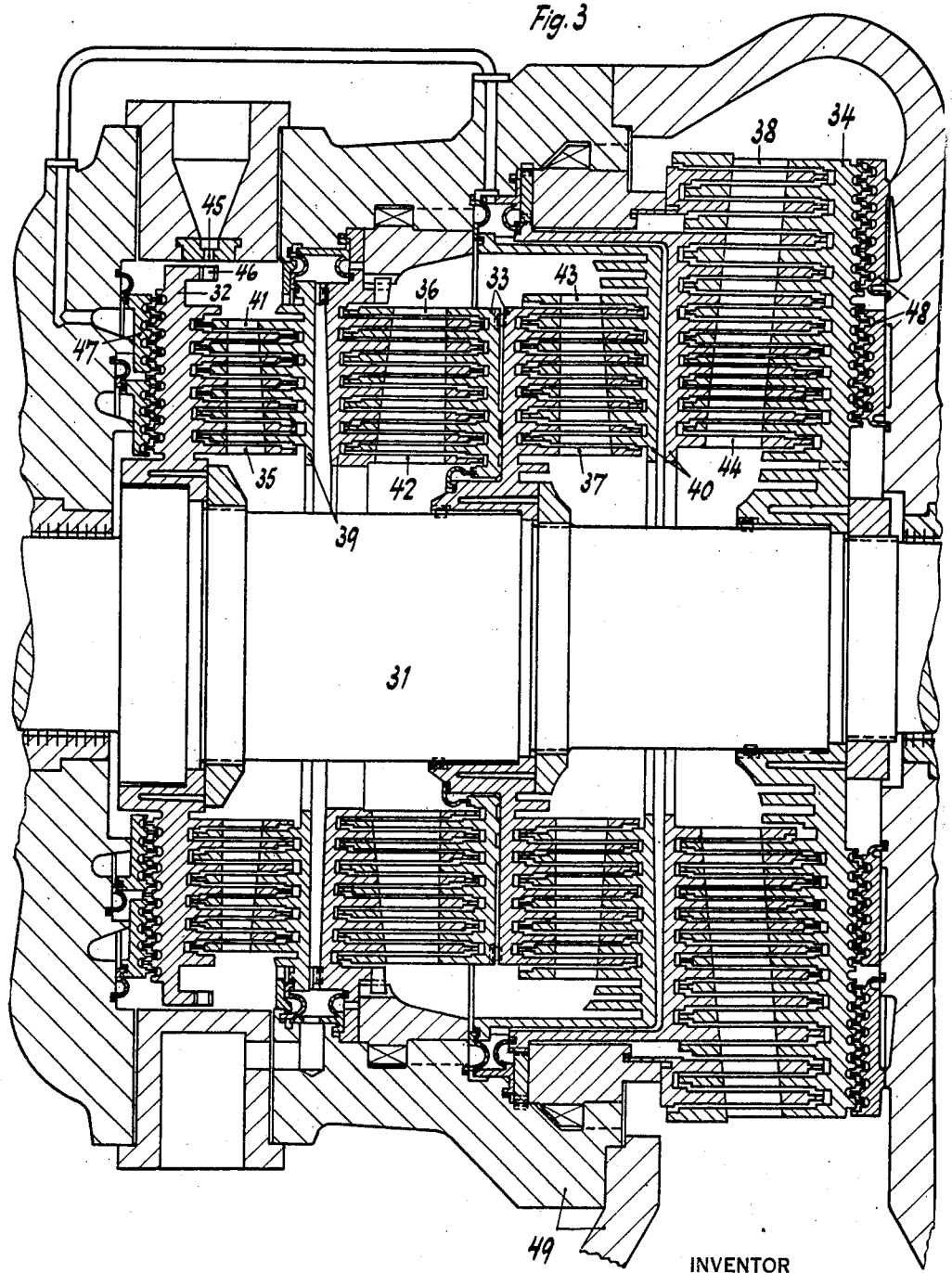

Patented Mar. 14, 1944

2,344,101

UNITED STATES PATENT OFFICE 2,344,101

ELASTIC SUPPORT OF DISKS FOR RADIAL FLOW ROTARY MACHINES

Ulrich Meininghaus, Mulheim-Ruhr, Germany; vested in the Alien Property Custodian Application March 25, 1941, Serial No. 385,115 In Germany April 1, 1940

2 Claims. (Cl. 253—39)

The present invention relates to the construction of means for elastically supporting the disks of radial flow rotary machines, and especially the disks carrying blades or labyrinth packing of radial flow steam and gas turbines.

It is the general object of the invention to provide an elastic and tight joint between such disks and the supporting machine part, preferably the housing, which joint is capable of withstanding a high pressurue difference prevailing between the two sides of the disk, and in particular a joint which avoids an unduly large axial length and parts projecting in axial direction from the space otherwise occupied by the disk body. Other, more specific objects of the invention will appear from the detailed description hereinafter.

The accompanying drawings illustrate by way of example steam turbine disks according to the invention. Fig. 1 shows a vertical section through the upper half of such a disk with the elastic joint which is assembled in the direction of the axial thrust exerted on the disk by the steam pressure. Fig. 2 is a similar section with the opposite direction of assembling. Fig. 3 shows a vertical section through the whole turbine.

In Fig. 1 the disk is split in two halves 1 and 1a carrying the blades 2 and 3. Annular flanges 4 and 4a are arranged at the outer rims of the disk halves, such flanges being clamped between the radially extended surfaces 5 and 6. The clamped surfaces are in the radial direction smaller than a quarter of an inch and thus allow not only for free radial movement of the disk halves, but also for any inclination which the lateral pressure on the disk halves may cause. The radially extended surfaces 5 and 6 are arranged on a special flange 7 and a plate 8 screwed on it. The whole assembly fastened to flange 7 is mounted in the direction of the lateral pressure exerted on the disk halves. The direction is given in Fig. 1 by the arrow. The flange 7 itself is bolted to the housing 9 from the other side.

At 10, 11, 12 and 13 thin walled rings 14 and 15 of semicircular cross section are fastened with their rims to the disk halves 1, 1a and the flange 7 by means of caulking wires. In this way I obtain an absolutely tight connection between the disk halves and the flange 7. Neither high pressure nor high temperature difference within the limits of operation will ever cause the slightest leakage at the caulked joints. By reason of the small thickness of the caulked in ends of the rings 14 and 15 no appreciable change in thickness of the spanned in ends can occur due to expansion or contraction by change in temperature or pressure. Such difficulties, as are known with screwed on or bolted on flanges of considerable thickness, are impossible with this joint. Instead of fastening by means of caulking in a wire, the material of the ring end or of the rim to which the ring end is to be fastened may be expanded by a special tool, thus increasing the diameter and pressing the parts tightly against each other.

By giving the cross-section of the thin walled elastic rings 14 and 15 a semicircular shape I obtain the strength in these rings required to withstand even a high difference in pressure between both sides of the rings. The radius of the semicircle of the cross section I make comparatively small as compared with the mean radius of the ring itself. It is well known that any pressure difference exerted on a cylinder will cause a circumferential stress which is greater than the pressure difference in the ratio of the mean radius of the cylinder to the thickness of the wall. If, for example, the wall thickness of the cylinder amounts to one eighth of an inch and the mean diameter to 50 inches, then a pressure difference of 300 lbs./sq. in. would cause a circumferential stress of $$\frac{50 \times 300}{2 \times \frac{1}{8}} = 60{,}000 \text{ lbs./sq. in.}$$

Stresses of this magnitude cannot safely be permitted in addition to the bending stresses which are unavoidable. On the other hand, if the semicircular cross section of the circumference of the elastic ring has, for example, a diameter of one inch, the circumferential stress at the same pressure difference will amount to only $$\frac{1 \times 300}{2 \times \frac{1}{8}} = 1{,}200 \text{ lbs./sq. in.}$$

It is true that this stress when referred to the whole ring runs rather in radial planes, but it prevents with absolute safety the occurrence of the above calculated much higher circumferential stress.

In so far as the elasticity of the semicircular cross section of the ring should be deemed insufficient, I limit the required amount of elasticity, for example, by shrinking the rims 4 or 4a of the disks on the inner rims of the rings 14 and 15, or by shrinking the outer rims of the rings 14 and 15 on the flange 7, or vice versa. I gain this possibility of shrinking by having both legs of the semicircular cross section of the ring pointing in about axial direction at the lines of junction with the ring ends 10, 11, 12 and 13 which connect the ring rigidly to the disk halves 1 and 1a or the flange 7. I secure with this arrangement, on account of which the semicircle of the cross section opens in axial direction, also a better distribution of the bending stresses which occur when the span between the two legs of the semicircle of the cross section is diminished or increased by a difference in expansion of the disk halves 1 or 1a and the flange 7. By changing the span of the axially pointing legs circumferential stresses arise in these legs which effect an improved distribution of the bending stresses and prevent a local overstressing. These circumferential stresses prevent in addition any buckling of the thin legs of the elastic rings 14 and 15.

To relieve the thin walled elastic rings 14 and 15 from the transfer of the torque which is exerted by the steam on the blading 2 and 3 projections 16 or keys 17 are provided which fit into corresponding grooves. These projections or keys may at the same time keep the disk halves 1 and 1a in their central position should the thin-walled elastic rings 14 and 15 break for some reason. Interlocking shoulders 13' may also be provided at the outer circumferences of the disk halves 1 and 1a.

By splitting the disk in two halves 1 and 1a and fastening each half by a separate elastic ring 14 and 15 to the flange 7, I make it possible to admit or lead off steam to or from the inner rim between the blading 2 and 3 through the bore 18 in the flange 7. All joints are absolutely tight at all changes in temperature and pressure and the admitted or led off steam flows in equal distribution over the rear surfaces of the disk halves thus securing a uniform change in temperature of the disk material.

Fig. 2 shows a similar arrangement to Fig. 1. The same reference characters apply to this figure. In Fig. 2 the disk halves 1 and 1a are together with the elastic rings 14 and 15 moved into the housing against the direction of the thrust exerted by the steam pressure on the disks, which direction is given by the arrow in Fig. 2. This way of mounting obviates the need for a flange at the high pressure side of the turbine. The elastic rings 14 and 15 I fasten with their outer rims directly into the housing 9. No steam tight joint between the flange 7 and the housing 9 is required as was the case with the arrangement of Fig. 1. The bore 18 does not run through flange 7, as in Fig. 1, but through the housing 9 only. It is thus possible to form the flange 7 with a bayonet instead of bolting it to the housing 9. All the difficulties which so easily arise with heavily loaded screwed on flanges are thus avoided. Much space is saved in this way and the outside diameter of the housing considerably reduced. To make sure that the axial thrust exerted by the steam pressure does not loosen the caulking connection at 12 and 13 an annular projection 19 is provided at the elastic ring 14 and an additional ring 20 is pressed against the joint at 13 by means of screws 21. As any axial movement of the inner legs of the elastic rings 14 and 15 exerts a rolling action on the semicircular cross section of these rings, winding the cross section like the spring of a watch, and as also the plate 8 is elastic, the bayonet ring 7 is easily brought into place. Making use of the high elasticity of a ring with a circumference of semicircular cross section in the direction in which the legs of the semicircle point is a special feature of my invention.

The steam turbine which Fig. 3 shows in section makes use of the present invention for all stationary disks. The shaft of the turbine appears at 31 and carries the wheels 32, 33 and 34 with the blades 35, 36, 37 and 38. The disks 39 and 40 carry the stationary blades 41, 42, 43 and 44. The fastening of the disk 39 corresponds with Fig. 2, the fastening of the disk 40 is similarly arranged. The steam enters through the nozzles 45, passes the impulse blade row 46 and then the reaction blading 41, 42, 43 and 44. The axial thrust of the reaction blading is balanced by the labyrinth disk 47 and 48. 49 represents the housing of the turbine.

Obviously, my invention is not restricted to rotary machines of the specified form illustrated, but for example may be used with disks along which the working medium flows in the same direction on both sides. Or only one side of the wheel may carry blades, the other side for instance labyrinth packing.

I claim:

1. In combination, two blade or labyrinth carrying disks for radial flow rotary machines, in particular steam or gas turbines, arranged with one side of each disk adjacent the other, blades carried on the other sides of said disks, a fixed part of said machine supporting said disks, two thin-walled elastic rings spaced from each other and respectively connecting said disks to said machine part, and an aperture through said machine part for the passage of working medium through the space between said disks and between said elastic rings.

2. A combination according to claim 1 wherein caulking wires directly fasten one rim of each of said thin-walled elastic rings to said fixed part of the machine.

ULRICH MEININGHAUS.